3,040,036
PROCESS FOR THE AROMATIZATION OF RING A
OF STEROID COMPOUNDS
Kyosuke Tsuda, Urawa City, Eiji Oki, Tokyo, Shigeo Nozoe, Kamakura City, and Yutaka Okada, Tokyo, Japan, assignors to Sankyo Company, Limited, Tokyo, Japan
No Drawing. Filed Sept. 12, 1961, Ser. No. 137,526
Claims priority, application Japan Sept. 19, 1960
4 Claims. (Cl. 260—239.55)

This invention relates to a process for effecting aromatization of ring A and demethylation of the methyl group at 19 position of steroid compounds. More particularly, it relates to a process for preparing 19-nor steroid compounds with aromatized ring A having the formula

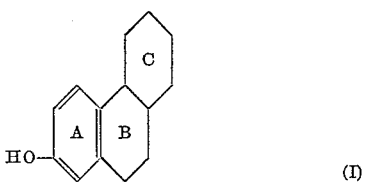

insofar as rings A, B and C of the steroid nucleus are concerned, said compounds having one double bond between two carbon atoms of the steroid nucleus at one of 6(7), 8(9) and 9(11) positions, by aromatization of the ring A and demethylation of the methyl group at 19 position of the corresponding 3 keto-1, 4-diene steroid compounds having the formula

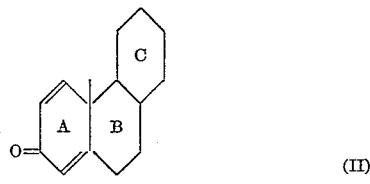

insofar as rings A, B and C of the steroid nucleus are concerned.

It has been heretofore proposed to produce steroid compounds with aromatized ring A from the corresponding steroid compounds by thermal degradation (H.H. Inhoffen: Angew. Chem., 53, 471 (1940)) or by heating in mineral oil (C. Djerassi et al.: J. Am. Chem. Soc., 73, 1523 (1951); ibid. 72, 4543 (1950); E. B. Hershberg, M. Rubin, E. Schwenck: J. Org. Chem., 15, 292 (1950)). However, use of these methods is very limited because they cannot be applied to steroid compounds having substituents unstable to heat on the steroid nucleus owing to the use of high temperature such as about 600° C. Moreover, it is disadvantageous that low yield of the desired product and complicated procedures are associated with these methods.

Furthermore, method of ring A aromatization of steroid compounds by means of acid is known. However, there occurs in this method migration of the angular methyl group to ring A with the result that such compounds as having the Formula I cannot be prepared by this method.

It is an object of this invention to provide a process for converting 3-keto-1, 4-diene steroid compounds having the above-described Formula II insofar as rings A, B and C of the steroid nucleus are concerned to the corresponding 19-nor steroid compounds with aromatized ring A having the above-described Formula I insofar as rings A, B and C of the steroid nucleus are concerned without the above-mentioned disadvantages in an economically advantageous way. Other objects of this invention will be apparent herein below.

According to the present invention, the above-mentioned objects can be achieved by treating a 3-keto-1, 4-diene steroid compound having the above-described Formula II with zinc in an alcohol selected from the group consisting of aliphatic alcohols having 2 to 6 carbon atoms, such as ethanol, propanol, butanol, tertiary amyl alcohol, n-amyl alcohol, isoamyl alcohol and hexanol, dihydric alcohols, such as ethylene glycol and propylene glycol, and benzyl alcohol to form the corresponding 19-nor steroid compound with aromatized ring A having the above-described Formula I.

In carrying out the present invention, it is preferable to dissolve a starting steroid compound in an alcohol as described above, add zinc to the solution, and heat the resulting mixture under reflux for about 1 to 5 hrs. The reaction time may vary depending upon the relative amount of zinc added base on that of the starting steroid compound, activity of the zinc and temperature. The amount of zinc used may be sufficient to convert the starting steroid compound to the desired product, but the preferred range is from about 5 to 50 g. per gram of the starting steroid compound.

After completion of the reaction, the desired product may be isolated from the reaction mixture by conventional methods. For example, after completion of the reaction, the reaction mixture is cooled, the zinc is removed by filtration, the filtrate is evaporated to dryness in vacuo and then the resulting residue is recrystallized from acetone, methanol, diethyl ether or ethyl acetate to obtain the desired product. Alternatively, the desired product is obtained by adding water to the filtrate after removal of the zinc, extracting the resulting mixture with a water-immiscible organic solvent such as chloroform, diethyl ether or ethyl acetate, washing the extract with water, removing the solvent from the washed extract, and then recrystallizing the residue from acetone, methanol, ethanol or ethyl acetate.

Representative of the 3-keto-1.4-diene steroid compounds used as the starting material in the process according to the present invention are 17β-hydroxyandrosta-1,4,6-triene-3-one
17β-acetoxy-androsta-1,4,6-triene-3-one
androsta-1,4,6-triene-3,17-dione
pregna-1,4,6,16-tetraene-3,20-dione
17α,21-dihydroxypregna-1,4,6-triene-3,20-dione 21-acetate
androsta-1,4,9(11)-triene-3,17-dione
17α,21-dihydroxypregna-1,4,9(11)-triene-3,20-dione 21-acetate
11β-hydroxyandrosta-1,4,8-triene-3,17-dione
11β,17β-dihydroxyandrosta-1,4,8-triene-3-one
11β,17α,21-trihydroxypregna-1,4,8-triene-3,20-dione 21-acetate
11β-hydroxypregna-1,4,8-triene-3,20-dione
17β-hydroxyandrosta-1,4,9(11)-triene-3-one
17β-acetoxyandrosta-1,4,9(11)-triene-3-one
pregnan-1,4,9(11)-triene-3,20-dione
17α,21-dihydroxypregnan-1,4,9(11)-triene-3,20-dione BMD
11β,17β-dihydroxyandrosta-1,4,8-triene-3-one 17-acetate
11β-hydroxyandrosta-1,4,6-triene-3,17-dione
cholesta-1,4,6-triene-3-one
ergosta-1,4,6,22-tetraene-3-one
stigmasta-1,4,6,22-tetraene-3-one
spirosta-1,4,9(11)-triene-3-one
11β-hydroxyspirosta-1,4,8-triene-3-one, and
17α-methylandrosta-1,4,9(11)-triene-17β-ol-3-one The above-mentioned 3-keto-1,4-diene steroid compounds are converted by the process according to the present invention to the corresponding compounds as follows: Δ6-estradiol, Δ6-estradiol 17-acetate, Δ6-estrone, 19-norpregna-1,3,5(10),6,16-pentaene-3-ol-20-one, 19- norpregna,1,3,5(10),6-tetraene-3,17α,21-triol-20-one 21-acetate, estra-1,3,5(10),9(11)-tetraene-3-ol-17-one (Δ9(11)-estrone), 19-norpregna-1,3,5(10),9(11)-tetraene-3,17α,21-triol-20-one 21-acetate, 3,11β-dihydroxyestra-1,3,5(10),8-tetraen-17-one(11β-hydroxy-Δ8-estrone), 3,11β,17β-trihydroxyestra-1,3,5(10),8-tetraene(11β-hydroxy-Δ8-estradiol), 19-norpregna-1,3,5(10),8-tetraene-3,11β,17α,21-tetraol-20-one 21-acetate, 19-norpregna-1,3,5(10),8-tetraene-3,11β-diol-20-one,3,17β-dihydroxyestra-1,3,5(10),9(11) - tetraene,3,17β - dihydroxyestra - 1,3,5(10),9(11)-tetraene 17-acetate, 19-norpregnan-1,3,5(10),9(11)-tetraene-3-ol-20-one, 19-norpregnan-1,3,5(10),9(11)-tetraene-3,17α,21-triol-20-one BMD, 3,11β,17β-trihydroxyestra-1,3,5(10),8-tetraene 17-acetate,3,11β - dihydroxyestra - 1,3,5(10),6-tetraene-17-one, 19-norcholesta-1,3,5(10),6-tetraene-3-ol, 19-norergosta-1,3,5(10),6,22-pentaene-3-ol, 19-norstigmasta-1,3,5(10),6,22-pentaene-3-ol, 19-norspirosta-1,3,5(10),9(11)-tetraene-3-ol, 19-norspirosta-1,3,5(10),8-tetraene-3,11β-diol, 17α-methylestra-1,3,5(10),9(11)-tetraene-3,17β-diol.

The following examples are given as illustrative of our process, but are not intended to be limitative upon the scope thereof.

*Example 1*

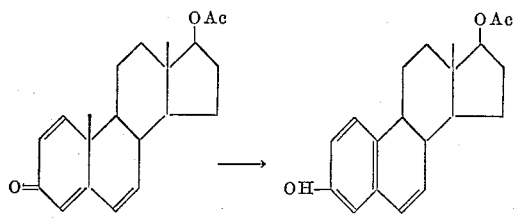

To a suspension of 1 g. of 17-acetoxyandrosta-1,4,6-trien-3-one, M.P. 151° C., in 75 ml. of ethylene glycol are added 15 g. of zinc dust washed successively with hydrochloric acid, water and acetone. The resulting mixture is heated under reflux with stirring for 3 hrs. After cooling the supernatant is poured into water, followed by extraction of the separated oil with ethyl acetate.

The zinc is washed with several portions of ethyl acetate containing 10% acetic acid. The combined extract and washings are washed with aqueous sodium bicarbonate and dried over sodium sulfate.

The solvent is then removed and the residue is mixed with a small amount of methanol. The mixture is allowed to stand at a cold place to precipitate crystals. The crystals are separated by filtration and recrystallized from methanol to give 120 mg. of Δ6-estradiol-17-acetate, M.P. 250–251° C., λmax 262 mμ (ε8900), 303mμ (ε2700).

*Example 2*

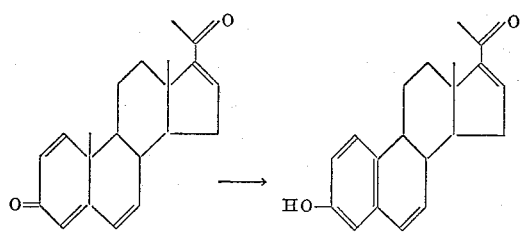

A mixture of 1.2 g. of pregna-1,4,6,16-tetraene-3,20-dione and 90 ml. of ethylene glycol is heated at 120° C. to a complete solution. To the solution are added 30 g. of zinc dust washed successively with 10% hydrochloric acid, water and acetone. The reaction temperature is then gradually raised to 190° C. in 20 min. with vigorous stirring. Heating under reflux is continued for additional 3 hrs.

After cooling, the zinc is removed from the reaction mixture by filtration and the filtrate is poured into a large amount of water. The crystals formed are separated by filtration, washed thoroughly with water and dried to give 700 mg. of the crude product. It is dissolved in benzene and to the solution is added petroleum ether. The resulting solution is chromatographed on 30 g. of silica gel for purification. Elution is first made with benzene-petroleum ether (1:1) and then with the same solvent with increased ratio of benzene.

The solvent is removed from fraction eluted with benzene-petroleum ether (99:1) and to the residue is added a small amount of methanol. The mixture is chilled to precipitate crystals, which are recrystallized from methanol.

19 - norpregna - 1,3,5(10),6,16 - pentaene - 3 - ol - 20-one is obtained as prisms melting at 240–241° C., 110 mg.

*Analysis.*—Calc'd for $C_{20}H_{22}O_2$: C, 8.60; H, 7.53. Found: C, 81.69; H, 7.60.

$\lambda_{max.}^{CH_3OH}$ 224 mμ (ε 38000)

270 mμ (ε6800), 304 mμ (ε2700).

*Example 3*

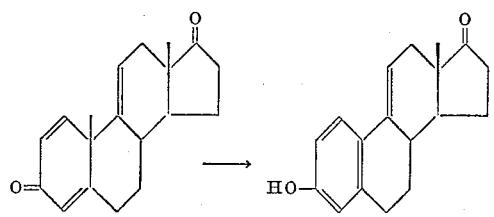

To a solution of 500 mg. of androsta-1,4,9(11)-triene-3,17-dione in 50 ml. of ethylene glycol is added 10 g. of zinc dust. The mixture is heated under reflux with stirring. After cooling, the zinc is removed by filtration and the filtrate is poured into a large amount of water followed by extraction with diethyl ether. The diethyl ether layer is washer with water, dried. The ether is then distilled off and the residual oily substance is dissolved in a small amount of methanol. The solution is chilled to be crystallized. The crystals are separated by filtration and recrystallized from methanol to give 250 mg. of Δ9(11)-estrone.

*Example 4*

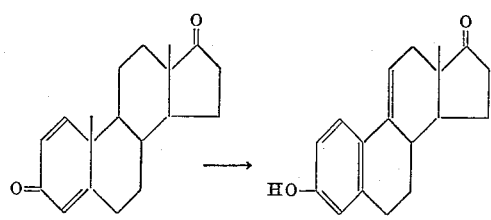

To a solution of 282 mg. of androsta-1,4,9(11)-triene-3,17-dione in 20 ml. of ethanol is added 10 g. of zinc dust washed successively with diluted by hydrochloric acid and water. The mixture is heated under reflux with stirring for 4 hrs. The reaction mixture is cooled and the zinc is removed by filtration. The ethanol is removed from the filtrate by evaporation in vacuo and the residue is recrystallized from acetone-diethyl ether to give 190 mg. of Δ9(11)-estrone melting at 254–258° C.;

$\lambda_{max.}^{CH_3OH}$ 263 mμ (ε 18000)

229 mμ (ε3200).

*Example 5*

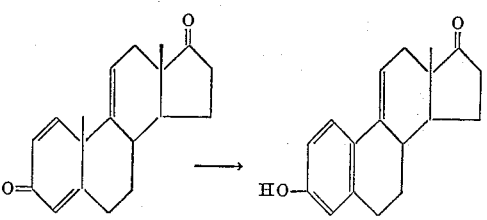

The same procedures are repeated as those in Example 4 except that 20 ml. of propanol are used in place of the ethanol to give 210 mg. of Δ9(11)-estrone.

*Example 6*

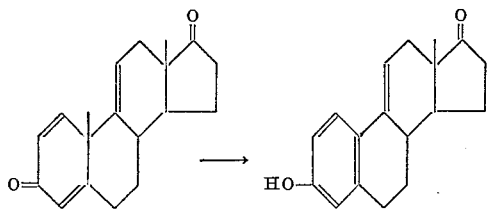

The same procedures are repeated as those in Example 4 except that 30 ml. of tertiary butanol are used in place of the ethanol to give 210 mg. of Δ9(11)-estrone.

*Example 7*

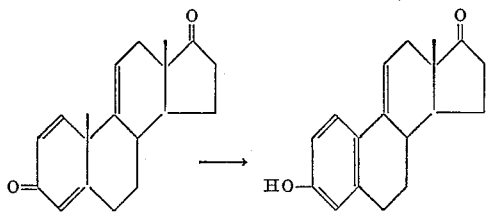

The same procedures are repeated as those in Example 4 except that 30 ml. of n-amyl alcohol are used in place of the ethanol to give 168 mg. of Δ9(11)-estrone.

*Example 8*

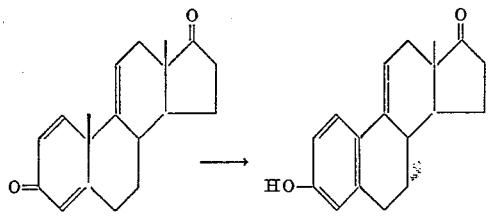

To a solution of 282 mg. of androsta-1,4,9(11)-triene-3,17-dione in 30 ml. of benzyl alcohol are added 10 g. of zinc dust washed successively with diluted hydrochloric acid and water. The mixture is heated under reflux with stirring for 4 hrs. The reaction mixture is cooled and the zinc is removed therefrom by filtration. To the filtrate are added 60 ml. of diethyl ether and the resulting solution is shaken with 5% aqueous potassium hydroxide to dissolve the phenolic compound in the alkali solution. The alkali solution layer is then washed with ether and acidified with 1% hydrochloric acid followed by extraction with ethyl acetate. The extract is washed successively with diluted aqueous sodium bicarbonate and water and dried. The solvent is removed from the extract by distillation and the residue is recrystallized from acetone-diethyl ether to give 170 mg. of Δ9(11)-estrone, M.P. 256–258° C.

*Example 9*

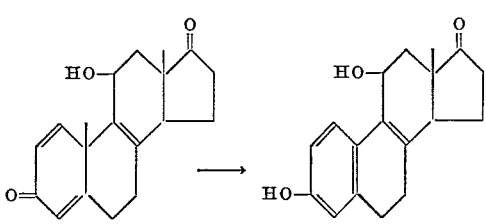

To a solution of 298 mg. of 11β-hydroxyandrosta-1,4,8-triene-3,17-dione in 30 ml. of ethanol is added 10 g. of zinc dust washed successively with diluted hydrochloric acid and water. The mixture is heated under reflux with stirring for 4 hrs. The reaction mixture is cooled and the zinc is removed by filtration. The ethanol is distilled off in vacuum from the filtrate and the residue is allowed to stand at a cold place after admixed with a small amount diethyl ether. The crystals precipitated are separated by filtration and recrystallized from acetone-diethyl ether to give 200 mg. of 3,11β-dihydroxyestra-1,3,5(10),8-tetraen-17-one, M.P. 184–187° C.;

$$\lambda_{max.}^{CH_3OH}\ 279\ m\mu\ (\epsilon\ 18000)$$

*Example 10*

The same procedures are repeated as those in Example 9 except that 30 ml. of tertiary butanol are used in place of the ethanol to give 220 mg. of 3,11β-dihydroxyestra-1,3,5(10),8-tetraen-17-one.

*Example 11*

The same procedures are repeated as those in Example 9 except that 30 ml. of n-amyl alcohol are used in place of the ethanol to give 200 mg. of 3,11β-dihydroxyestra-1,3,5(10),8-tetraen-17-one.

We claim:

1. A process for preparing 19-nor steroid compounds with aromatized ring A having the formula

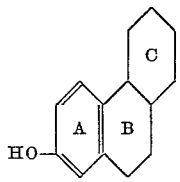

insofar as rings A, B and C of the steroid nucleus are concerned, said compounds having one double bond between two carbon atoms of the steroid nucleus at one of 6(7), 8(9) and 9(11) positions which comprises treating the corresponding 3-keto-1,4-diene steroid compound having the formula

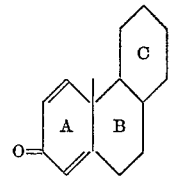

with zinc in an alcohol selected from the group consisting of aliphatic alcohols having two to six carbon atoms, dihydric alcohols and benzyl alcohol.

2. A process for preparing 19-nor steroid compounds with aromatized ring A having the formula

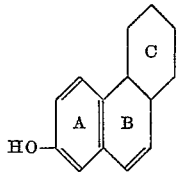

insofar as rings A, B and C of the steroid nucleus are concerned which comprises treating the corresponding 3-keto-1,4-diene steroid compound having the formula

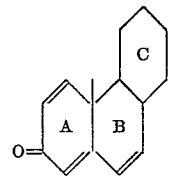

with zinc in an alcohol selected from the group consisting of aliphatic alcohols having two to six carbon atoms, dihydric alcohols and benzyl alcohol.

3. A process for preparing 19-nor steroid compounds with aromatized ring A having the formula

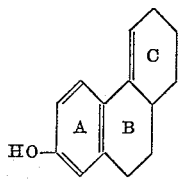

insofar as rings A, B and C of the steroid nucleus are concerned which comprises treating the corresponding 3-keto-1,4-diene steroid compound having the formula

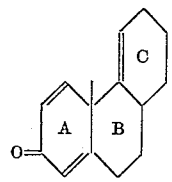

with zinc in an alcohol selected from the group consisting of aliphatic alcohols having two to six carbon atoms, dihydric alcohols and benzyl alcohol.

4. A process for preparing 19-nor steroid compound with aromatized ring A having the formula

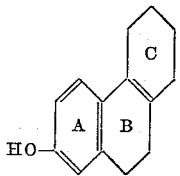

insofar as rings A, B and C of the steroid nucleus are concerned which comprises treating the corresponding 3-keto-1,4-diene steroid compound having the formula

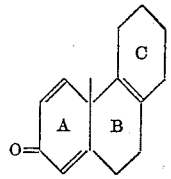

with zinc in an alcohol selected from the group consisting of aliphatic alcohols having two to six carbon atoms.

No references cited.